(No Model.)
J. R. PHELPS.
DENTAL MOLD FOR TEETH.
No. 512,840. Patented Jan. 16, 1894.
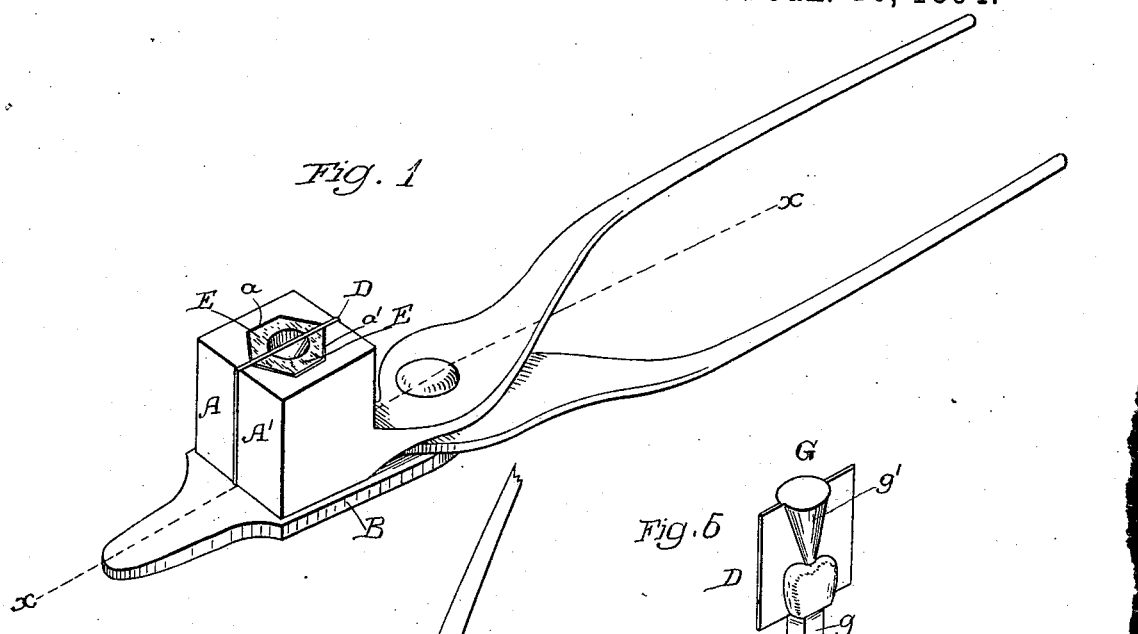
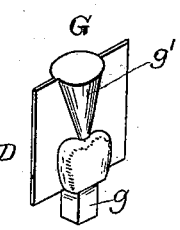
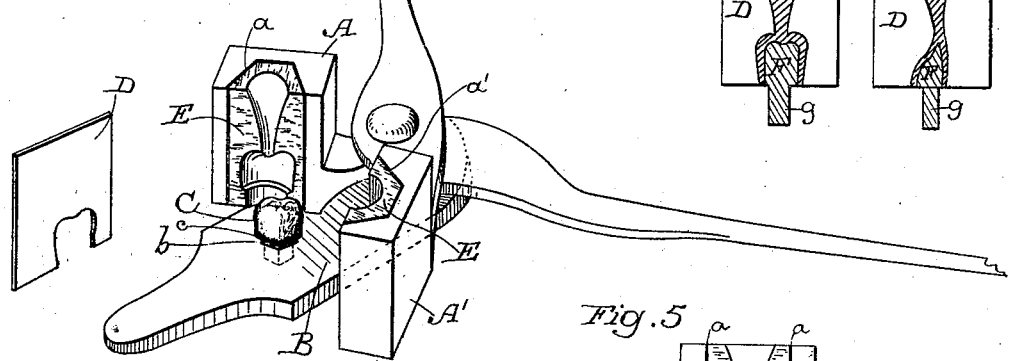
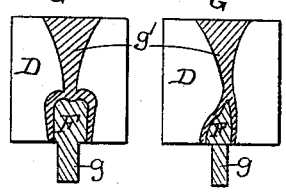
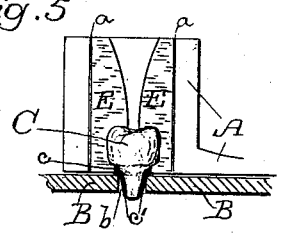
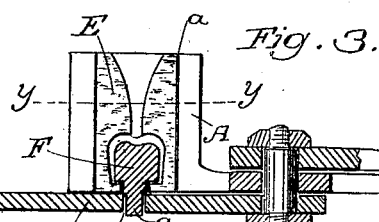
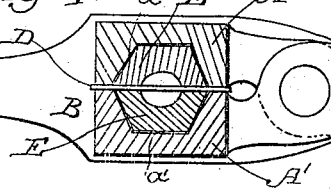
Witnesses,
G. H. Nurse
J. A. Bayless
Inventor
James R. Phelps
By Dewey & Co.
atty.
THE NATIONAL LITHOGRAPHING COMPANY,
WASHINGTON, D. C.

UNITED STATES PATENT OFFICE.

JAMES R. PHELPS, OF MARYSVILLE, CALIFORNIA.

DENTAL MOLD FOR TEETH.

SPECIFICATION forming part of Letters Patent No. 512,840, dated January 16, 1894.

Application filed June 20, 1893. Serial No. 478,273. (No model.)

*To all whom it may concern:*

Be it known that I, JAMES R. PHELPS, a citizen of the United States, residing at Marysville, Yuba county, State of California, have invented an Improvement in Molds for Artificial Tooth-Crowns; and I hereby declare the following to be a full, clear, and exact description of the same.

My invention relates to the class of molds which are especially adapted and designed for the formation of metallic artificial tooth crowns.

My invention consists in the novel construction of the mold, and the arrangement and combination of its parts which I shall hereinafter fully describe and specifically claim.

The object of my invention is to facilitate the manufacture of metallic artificial tooth crowns.

The practice at present of manufacturing these crowns is to stamp or swage a metallic cap to the shape of the cutting or grinding surfaces of the tooth, and then to solder this cap on to a ring or band of metal which has been fashioned to substantially the shape of the tooth. This practice is a tedious and delicate one. By my apparatus, I am enabled to cast or mold the entire crown quickly and perfectly.

Referring to the accompanying drawings for a more complete explanation of my invention,—Figure 1 is a perspective view of my mold showing it closed. Fig. 2 is a view showing it open, and the dividing plate removed. Fig. 3 is a vertical longitudinal section showing the core F in place. Fig. 4 is a horizontal section on the line $y\,y$ of Fig. 3. Fig. 5 is a section showing the artificial tooth pattern in place. Fig. 6 is a perspective view of one of the specially prepared patterns G. Fig. 7 shows sectional views of two of such patterns.

The flask consists of the handled jaws A and A' having in their adjacent faces suitable recesses $a$ and $a'$ of any desired shape in cross section, and which are adapted to receive the plaster-of-paris, or other composition from which the mold or matrix sections are formed.

B is a bottom plate lying directly under the jaws A A' and said plate is mounted and fastened at its rear end upon the pivotal center or bolt of the two jaws whereby it is stationary, while the two jaws move over the plate equally and in opposite directions. The jaws come together accurately in the median line of the bottom plate B. In this bottom plate is made a core hole $b$.

In the simplest and most common operation of my mold, and in the absence of special patterns, which I shall hereinafter describe, I take an ordinary artificial tooth C matched as to location and size to the tooth to be molded, and press ordinary dentist's wax $c$ upon its base, thereby making it the proper size, and allowing an extension or shank $c'$ of said wax to extend downwardly, whereby the tooth may be fitted in the core hole $b$ of the bottom plate B, and as said core hole is in the median line of the bottom plate, the tooth, itself, will also be in this median line lying half over toward either jaw. Over this tooth I then fit a dividing plate D which is grooved to fit over the tooth and said plate is of sufficient dimensions to completely divide the recesses $a$ and $a'$ of the two jaws. The tooth C which serves as a pattern and the dividing plate D being in place, and the two jaws closed up to the median line, plaster-of-paris or other composition is then poured into the recesses $a\,a'$ of the jaws on each side of the dividing plate, and this material fills up these recesses and forms and sets about the tooth forming the pattern. When the material is sufficiently set, the jaws are opened, separating from each side of the dividing plate, and carrying the now formed mold or matrix sections E with them which readily divide and separate on each side of the dividing plate. These sections E will form at their lower ends the matrix for the tooth to be cast. When the jaws are thus opened, the artificial tooth which served as a pattern, is removed from the core hole, and if it is desired to cast or mold a solid metallic crown, it is only necessary then to close the jaws again with the mold sections, and to pour the molten metal down into the sections, a suitable hole being made in the top thereof leading down to the matrix portion. But in case it be desired to make a hollow metallic crown, as usually will be the case, I insert in the core hole $b$ a core F which will form the hollow in the cast or molded tooth. When this cast or molded tooth is removed, it is dressed off as is necessary. In a great many instances, however, it may not be necessary to use the ordinary artificial tooth as a pattern, and in place thereof I contemplate that completely furnished dental offices shall be provided with any number of separate patterns of different shapes as may be required. I have, for example, shown one of these previously prepared patterns by the letter G. This, it will be seen, is the pattern of a tooth having a shank $g$ which adapts it to fit in the core hole $b$ of the bottom plate, and an upper filling portion $g'$ which provides for the top opening in the matrix sections, and further this pattern has secured to it, as by being cast around it, the dividing plate D. This pattern may be inserted in the core hole, and the plaster-of-paris or other composition poured around it as before described. Then upon opening the jaws, the pattern may be removed. It is preferable to have the shank $g$ of this pattern made separate so that the pattern may be lifted off from it, and the latter remaining, may form the core F, heretofore described, when it is desired to cast the tooth hollow. The mold may likewise be used for bridge work, and a series of united teeth, by suitably enlarging it.

Having thus described my invention, what I claim as new, and desire to secure by Letters Patent, is—

1. A mold for metallic artificial tooth crowns, consisting of the opposing recessed jaws pivoted together whereby they move to and from each other, a bottom plate below the recesses of said jaws, and having a core hole, a suitable pattern inserted in said hole in the median line of the opposing jaws and a dividing plate projecting from the pattern and lying in the median line of the jaws and separating their recesses, substantially as herein described.

2. A mold for metallic artificial tooth crowns, consisting of the opposing recessed jaws pivoted together whereby they move to and from each other, a bottom plate below the recesses of said jaws, and having a core hole, a suitable pattern inserted in said hole in the median line of the opposing jaws, a dividing plate projecting from the pattern and lying in the median line of the jaws, and separating their recesses, and a removable core adapted to be fitted to the core hole of the bottom plate when the pattern is removed, substantially as herein described.

3. A mold for metallic artificial tooth crowns consisting of opposing pivoted jaws having recesses to receive the material of the mold or matrix sections, a stationary bottom plate over which said jaws move and mounted upon the pivotal bolt of said jaws whereby the movement of said jaws over the bottom plate is equal, a suitable pattern fitted to said plate within the recesses of the jaws, and about which the mold sections are formed, and a dividing plate separating said recesses and the formed mold sections, substantially as herein described.

4. A mold for metallic artificial tooth crowns consisting of opposing pivoted jaws having recesses to receive the material the mold or matrix sections, a stationary bottom plate over which said jaws move and mounted upon the pivotal bolt of said jaws whereby the movement of said jaws over the bottom plate is equal, a suitable pattern fitted to said plate within the recesses of the jaws, and about which the mold sections are formed, a dividing plate separating said recesses and the formed mold sections, and a core adapted to be removably fitted to the bottom plate when the pattern is removed, whereby the cast crown is made hollow, substantially as herein described.

5. A mold for metallic artificial tooth crowns, consisting of opposing jaws pivoted together and having recesses to receive the material of the mold or matrix sections, a stationary bottom plate over which said jaws move, said plate having a core hole, a pattern having a removable shank adapted to fit said hole to secure the pattern therein and when removed from the pattern to form a core, and a dividing plate secured to said pattern, substantially as herein described.

6. The patterns for molds for making metallic artificial tooth crowns, consisting of the tooth shapes having secured thereto the dividing plates, substantially as described.

7. The patterns for molds for making metallic artificial tooth crowns, consisting of the tooth shapes having secured thereto the dividing plates and having in their bases the removable shank cores, substantially as herein described.

In witness whereof I have hereunto set my hand.

JAMES R. PHELPS.

Witnesses:
S. H. NOURSE,
J. A. BAYLESS.